(12) United States Patent
    Hewitt

(10) Patent No.: US 10,399,131 B2
(45) Date of Patent: Sep. 3, 2019

(54) COMPOUND ROLL

(71) Applicant: HYPERION MATERIALS & TECHNOLOGIES (SWEDEN) AB, Stockholm (SE)

(72) Inventor: Stephen Hewitt, Coventry West Midlands (GB)

(73) Assignee: HYPERION MATERIALS & TECHNOLOGIES (SWEDEN) AB, Stockholm (SE)

( * ) Notice: Subject to any disclaimer, the term of this patent is extended or adjusted under 35 U.S.C. 154(b) by 2 days.

(21) Appl. No.: 15/125,943

(22) PCT Filed: Mar. 14, 2014

(86) PCT No.: PCT/IB2014/059793
§ 371 (c)(1),
(2) Date: Sep. 13, 2016

(87) PCT Pub. No.: WO2015/136330
PCT Pub. Date: Sep. 17, 2015

(65) Prior Publication Data
US 2017/0100756 A1   Apr. 13, 2017

(51) Int. Cl.
    *B22F 3/16*      (2006.01)
    *B22F 3/24*      (2006.01)
    (Continued)

(52) U.S. Cl.
    CPC ............... *B21B 27/03* (2013.01); *B22F 3/16* (2013.01); *B22F 3/24* (2013.01); *B22F 5/00* (2013.01);
    (Continued)

(58) Field of Classification Search
    CPC .. B22F 7/02; B22F 7/008; B22F 7/062; B22F 7/042; B22F 7/048; B22F 7/047; B22F 5/106; B21B 27/03; B21B 27/00
    (Continued)

(56) References Cited

U.S. PATENT DOCUMENTS 2,313,227 A    3/1943  De Bats
3,438,730 A *  4/1969  Shwayder ............ C09K 3/1409
                                                   423/440

(Continued)

FOREIGN PATENT DOCUMENTS

CN    1416374 A      5/2003
CN    101073786 A    11/2007
(Continued)

OTHER PUBLICATIONS

Rutz et al., High Density Processing of High Performance Ferrous Materials, May 8-11, 1994, Hoeganaes Corporation (Year: 1994).*

*Primary Examiner* — Jason L Vaughan

(57) ABSTRACT

A compound roll includes a sintered inner core of a first cemented carbide and at least one sintered outer sleeve of a second cemented carbide disposed around the inner core. The outer sleeve and inner core each have a joining surface, wherein when the inner core and outer sleeve are assembled each joining surface contact to form a bonding interface therebetween. When the assembled, sintered inner core and outer sleeve are heated to a predetermined temperature the sintered inner core and outer sleeve are fused together at the bonding interface to form the unitary compound roll. To reduce the overall cost of the compound roll, a lower cost cemented carbide, or a cemented carbide with a lower density can be used for the inner core and fused to an outer sleeve of a virgin cemented carbide, thereby reducing the powder cost and/or reducing the overall mass of the compound roll.

21 Claims, 8 Drawing Sheets

(51) Int. Cl.
*B22F 5/00* (2006.01)
*B22F 5/10* (2006.01)
*B22F 5/12* (2006.01)
*B22F 7/00* (2006.01)
*B22F 7/06* (2006.01)
*B28B 3/02* (2006.01)
*B21B 27/03* (2006.01)
*C04B 35/56* (2006.01)
*C04B 37/00* (2006.01)
*C22C 29/00* (2006.01)
*C22C 29/02* (2006.01)
*C22C 29/08* (2006.01)

(52) U.S. Cl.
CPC .............. *B22F 5/106* (2013.01); *B22F 5/12* (2013.01); *B22F 7/008* (2013.01); *B22F 7/06* (2013.01); *B22F 7/062* (2013.01); *C04B 35/5626* (2013.01); *C04B 37/001* (2013.01); *C22C 29/005* (2013.01); *C22C 29/02* (2013.01); *B21B 27/032* (2013.01); *B22F 2003/247* (2013.01); *B22F 2003/248* (2013.01); *B22F 2301/15* (2013.01); *B22F 2301/20* (2013.01); *B22F 2302/10* (2013.01); *B22F 2998/10* (2013.01); *B28B 3/02* (2013.01); *C04B 2235/3847* (2013.01); *C04B 2235/405* (2013.01); *C04B 2237/36* (2013.01); *C04B 2237/60* (2013.01); *C04B 2237/84* (2013.01); *C22C 29/08* (2013.01)

(58) Field of Classification Search
USPC .................. 492/1, 3, 49, 53, 54, 57, 58, 59
See application file for complete search history.

(56) References Cited

U.S. PATENT DOCUMENTS

| | | | |
|---|---|---|---|
| 3,577,619 A | 5/1971 | Strandel | |
| 3,953,194 A * | 4/1976 | Hartline, III | C22C 3/00 75/353 |
| 4,082,559 A * | 4/1978 | Mishuku | B21B 27/00 419/18 |
| 4,137,106 A | 1/1979 | Doi et al. | |
| 4,350,528 A * | 9/1982 | Engle | B22F 7/062 228/174 |
| 4,698,884 A | 10/1987 | Evans | |
| 4,868,065 A * | 9/1989 | Maruyama | B22F 7/06 428/547 |
| 5,145,105 A * | 9/1992 | Floroski | B23K 20/22 228/194 |
| 5,541,006 A * | 7/1996 | Conley | B22F 7/06 419/12 |
| 6,315,945 B1 * | 11/2001 | Macki | B22F 3/14 419/5 |
| 9,498,824 B2 * | 11/2016 | Sweetman | B22F 7/062 |
| 2008/0112834 A1 * | 5/2008 | Imazato | B22F 5/08 419/6 |
| 2009/0035169 A1 * | 2/2009 | Vaughn | B22F 5/08 419/53 |
| 2010/0038012 A1 * | 2/2010 | Tucker | B22F 5/106 156/86 |
| 2011/0123386 A1 * | 5/2011 | Mitchell | B22F 3/15 419/49 |
| 2014/0271008 A1 * | 9/2014 | Sweetman | B22F 7/062 408/230 |
| 2015/0274601 A1 * | 10/2015 | Zhang | B22F 7/02 428/428 |

FOREIGN PATENT DOCUMENTS

| | | |
|---|---|---|
| GB | 2036620 A | 7/1980 |
| JP | 02-041708 A | 9/1990 |
| JP | H02269515 A | 11/1990 |
| JP | 08-155507 A | 6/1996 |
| JP | 2011206819 A | 10/2011 |
| RU | 2158640 C2 | 11/2000 |
| SU | 206106 A1 | 1/1967 |

\* cited by examiner

COMPOUND ROLL

RELATED APPLICATION DATA

This application is a § 371 National Stage Application of PCT International Application No. PCT/IB2014/059793 filed Mar. 14, 2014.

TECHNICAL FIELD

The present invention relates to a compound roll of a sintered inner core made of a lower cost cemented carbide, or a cemented carbide with a lower density, that is fused to a sintered outer ring of a virgin cemented carbide, thereby reducing the powder cost for a compound roll and/or reducing the overall mass of the compound roll itself.

BACKGROUND

Roll wear is a key factor in improving mill output. During hot rolling of long steel products, the passform surface(s) of the roll becomes worn. Once worn, each passform must be re-ground and then the roll put back into service. This process is repeated until the passform depth reaches a point referred to as the 'scrap diameter' meaning that the roll can no longer be used. Referring to FIG. 1, the scrap diameter 12 of a roll 10 is approximately halfway between an outer diameter 14 and an inner diameter 16 with the remaining material 18 below the scrap diameter (scrap diameter to inner diameter) remaining unused.

Being virgin material, this represents a significant cost, so if this portion of the roll could be replaced with a lower cost recycled material then this would reduce the cost of a roll. For example, a standard 8" diameter roll uses approximately 25 kg of powder with the mass of unused material accounting for approximately 10.5 kg.

SUMMARY

In one aspect, a compound roll of the present invention includes a sintered inner core of a first cemented carbide and at least one sintered outer sleeve of a second cemented carbide disposed around the inner core. The at least one sintered outer sleeve and inner core each have a joining surface, wherein when the inner core and outer sleeve are assembled together each joining surface is brought into contact to form a bonding interface there between. When the assembled sintered inner core and sintered at least one outer sleeve are heated to a predetermined temperature, the inner core and outer sleeve are fused together at the bonding interface to form the compound roll.

In another aspect, a method of forming a compound roll includes the steps of providing a sintered inner core formed of cemented carbide and providing at least one sintered outer sleeve formed of a second cemented carbide. The sintered inner core and sintered at least one outer sleeve are assembled, the at least one outer sleeve and inner core each having a joining surface, such that when the at least one sintered inner core and outer sleeve are assembled each joining surface is brought into contact to form a bonding interface (3) there between. The assembled sintered inner core and sintered at least one outer sleeve are fused together at the bonding interface (30) to form the compound roll.

In still another aspect, a compound roll of a mill includes a sintered inner core of a first cemented carbide and a sintered outer sleeve of a second cemented carbide disposed around and fused to the inner core, the first cemented carbide being different from the second cemented carbide.

One advantage of the compound roll of the present invention is the potential savings maintenance costs for the rolling mill. Using a carbide material with a lower density for the inner core, even if it is a virgin grade, e.g. a 6% binder grade for the outer and a 10% or 15% binder for the inner, would reduce the overall mass of the roll, thereby reducing the, load on the bearings in the mill and other driveline ancillaries.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

A compound roll of the present invention includes a sintered inner core of the first cemented carbide and at least one sintered outer sleeve of a second cemented carbide disposed around the inner core. The at least one sintered outer sleeve and inner core each have a joining surface, wherein when the inner core and outer sleeve are assembled together each joining surface is brought into contact to form a bonding interface there between. When the assembled sintered inner core and sintered at least one outer sleeve are heated to a predetermined temperature, the inner core and outer sleeve are fused together at the bonding interface to form the compound roll.

Figure 1:
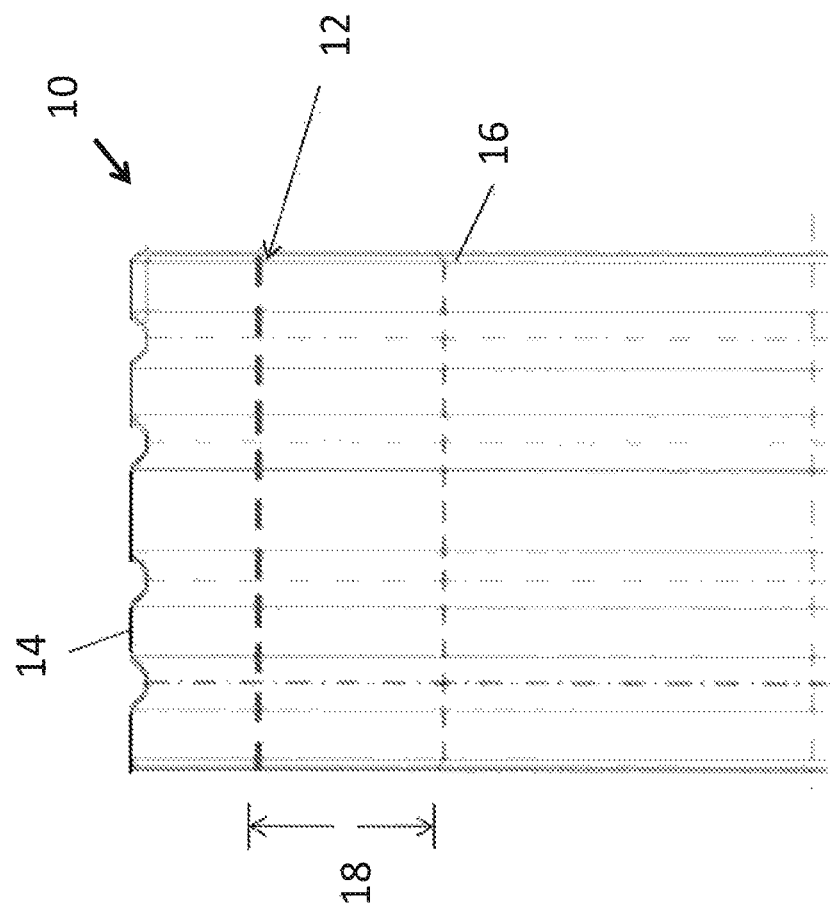
FIG. 1 is a cross-section of a known rolling mill roll.
Figure 2:
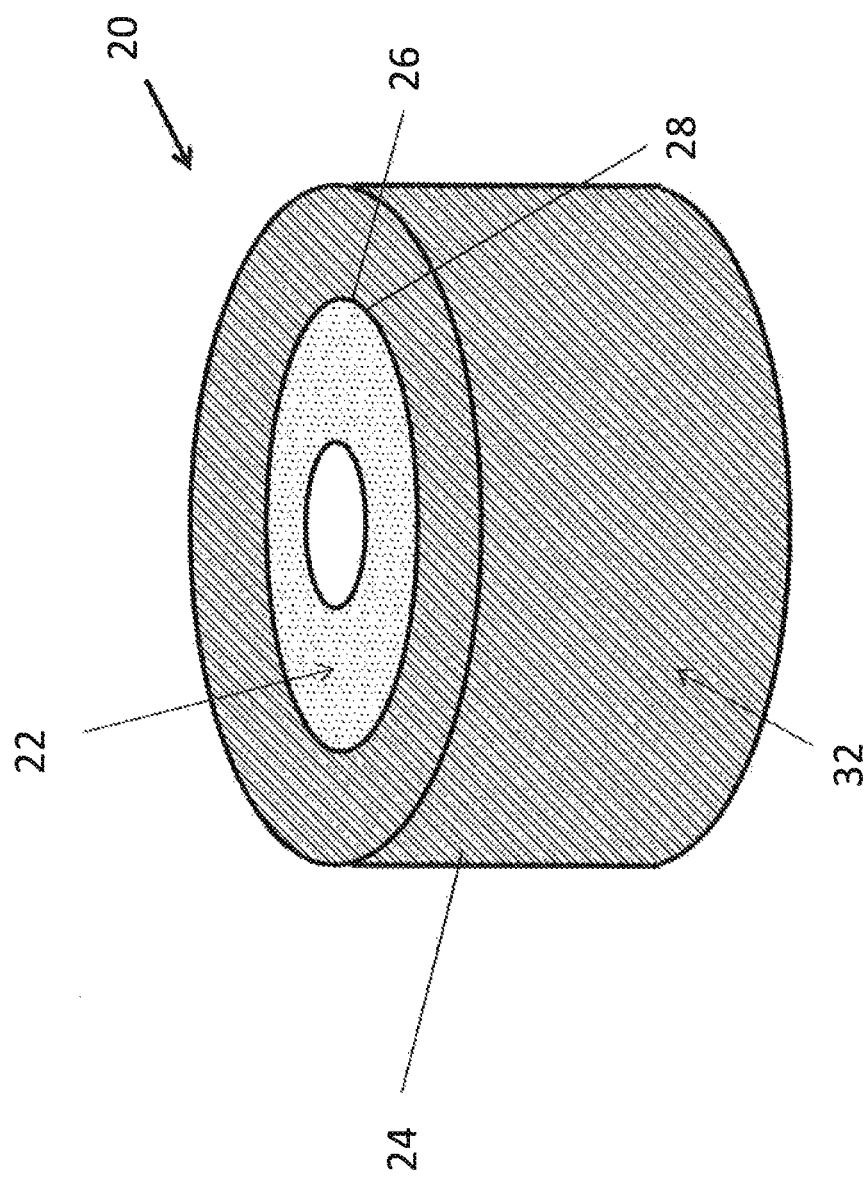
FIG. 2 is a perspective view of a compound roll of the present disclosure.

As shown in FIG. 2, a compound roll 20 of the present invention includes an liner core 22 and at least one outer portion or sleeve 24. Core 22, when inserted within outer sleeve(s) 24, as will be described further herein, forms a multi-part or compound roll.

Inner core 20 can be made of a first cemented carbide or cermet that is of a lower cost cemented carbide, i.e., as compared to the cost of a roll of solid virgin carbide, for example, recycled cemented carbide or a cemented carbide with a lower density, i.e., as compared to the density of a solid virgin carbide. This cemented carbide can have up to 100 wt % of recycled carbide. Although not illustrated, it should be appreciated that the core can be solid or of any shape and is not limited to a cylindrical or ring shape as shown.

Outer sleeve 24 is made of a second cemented carbide or cermet, for example, virgin cemented carbide. As described herein, virgin cemented carbide refers to a carbide that does don't include and reclaimed carbide. Recycled cemented carbide refers to cemented carbides that are recycled by metallurgical or chemical means, e.g., a zinc recovering process, electrolytic recovery and, extraction or oxidation, which are known to one skilled person in the art. Although only one outer sleeve is shown, the compound roll can includes a plurality of sleeves.

Thus, inner core 22 and outer sleeve 24 can be made from different grade cemented carbide of compacts of liquid phase materials, which include low melting phase components and high melting phase components. Cemented carbide normally has a hard phase comprising tungsten carbide and of one or more carbides, nitrides or carbonitrides of titanium, chromium, vanadium, tantalum, niobium bonded by a metallic phase binder typically cobalt, nickel, iron in varying proportions. The binder may be in the range of about 6 wt-% to 30 wt-%. Each of the first and second carbides can be tungsten carbide bonded with a binder.

Cemented carbides exist in different grades. The grades depend on the composition of the cemented carbides and on the grain size. For example, a high quality grade is a cemented carbide with a quantifiably greater performance and reliability in a given application compared with a low quality grade. It should be appreciated that other materials for the cores and sleeve(s) are contemplated by the present disclosure, for example, cermets. Thus the first and second carbides can be made of different cemented carbide.

Outer sleeve 24 can be pressed from ready to press powder (RTP) of cemented carbide using a grade having a binder that consists of Co only, with no additions of recycled cemented carbide. The average starting, i.e., as provided before treatment, WC grain size of the obtained sintered sleeve can range from about 5.0 to about 8.0 μm. As with the outer sleeve, inner core 22 can be pressed from RTP of cemented carbide using a mixed binder grade that consisted of Co/Ni/Cr along with recycled RTP of cemented carbide (for example, about 25 wt % of the cemented carbide was recycled). As with the outer sleeve, the average starting WC grain size of the inner core can range from about 5.0-about 8.0 μm.

Thus, compound roll 20 includes two parts—inner core 22 of lower cost cemented carbide and outer sleeve 24 of a higher grade cemented carbide or virgin cemented carbide. It should be appreciated that a plurality of outer sleeves can be provided and the present disclosure is not limited to two parts to form the compound roll. As will be further described herein, to create the compound roll, each of a sintered outer sleeve of virgin quality cemented carbide and a sintered inner core of recycled cemented carbide are fused together.

Figure 3:
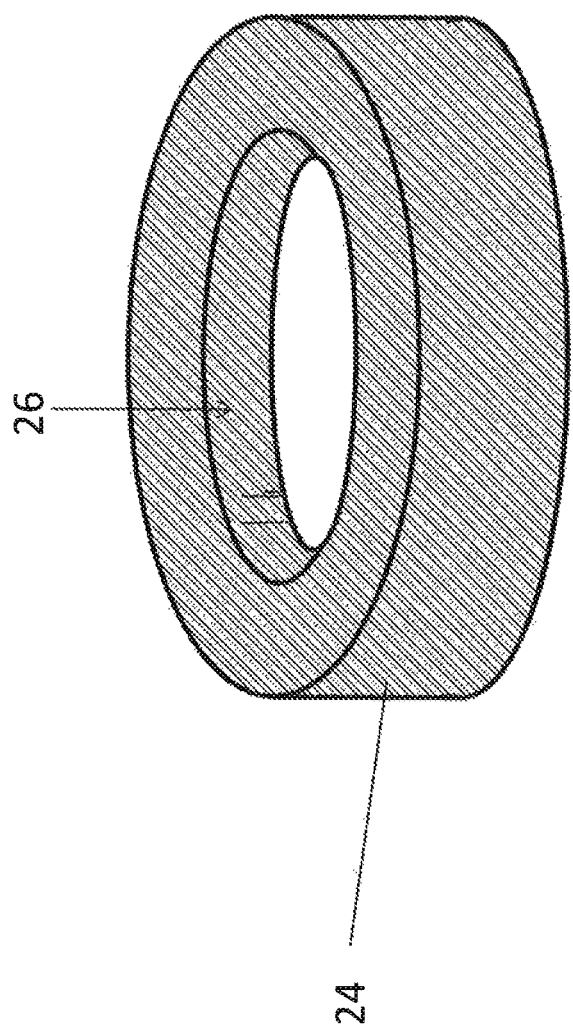
FIG. 3 is a perspective view of the outer sleeve.
Figure 4:
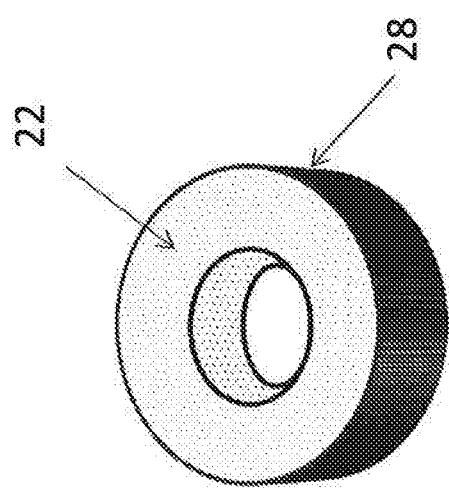
FIG. 4 is a perspective view of the inner core.

Referring to FIGS. 3 and 4, outer sleeve 24 has an inner joining surface 26 and inner core 22 includes an outer joining surface 28. As will be described further herein, sintered inner core 22 and at least one outer sleeve 24 are fused together at joining surfaces 26, 28 to form a unitary body 32, the first and second cemented carbides each have different melting points, wherein the assembled sintered at least one inner core and sintered at least one outer sleeve are heated to a temperature intermediate or lower than the melting point of the lower sintering temperature of the sintered core and sleeve to fuse the same at the bonding interface 30 to form the unitary body 32 (FIG. 2). A unitary body is defined as a singular integral body.

Figure 5:
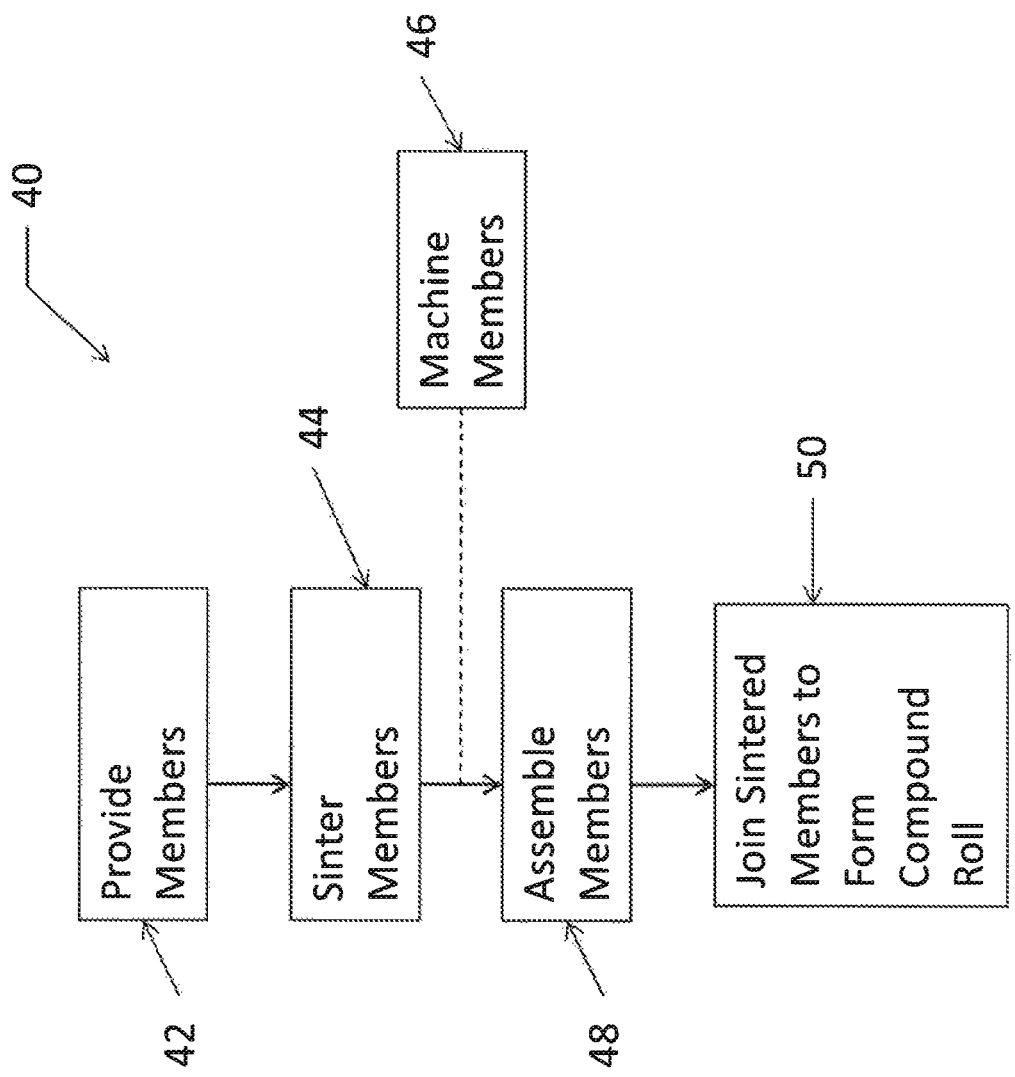
FIG. 5 is a flow diagram illustrating the steps of the present method.

According to a method 40 of the present invention illustrated in FIG. 5, the core 22 and sleeve(s) 24 of the compound roll are formed separately and provided in step 42, according to the particular desired end use. As set forth above, inner core 22 can be pressed from RTP of cemented carbide using a mixed binder grade that consisted of Co/Ni/ Cr along with recycled RTP of cemented carbide and outer sleeve 24 can be pressed from (RTP) of cemented carbide using a grade having a binder that consists of Co only, with no additions of recycled cemented carbide.

Each is then sintered for obtaining substantially the full density and hardness thereof in step 44. The core and sleeve(s) can be sintered in either a vacuum furnace or sinter-HIP furnace at their respective temperatures, for example, 1350° C.-1520° C., as known.

In step 46, the core and sleeve(s) are ground or machined at the mating/joining surfaces 26, 28 to provide a sufficiently smooth finish therebetween to encourage interference fit dining assembly. For example, inner core 22 was placed in liquid nitrogen for approximately 30 seconds in order to shrink it and allow it to be pressed into the outer sleeve, thus employing the phenomenon of thermal expansion to make a strong joint at interface 30.

The sintered core and sleeve(s) can also be cleaned, for example, in an acetone wash to provide a clean interface at the joining surfaces. Thereafter, the individual parts are assembled into the compound roll in step 48. The assembly of step 48 involves bringing the core and sleeve(s) into contact in an assembled relationship, with inner core 22 being positioned within outer sleeve 24, such that the first bonding or joining surface 26 is in mating engagement with second bonding or joining surface 28 (FIG. 2) to form unitary body 32. See FIG. 6. Thereafter, as described herein, the step of heating the members in the assembled relationship is employed to fuse the members together.

Prior art assembly of carbide members includes co-pressing, sintering either two green pieces or one green piece to one sintered piece, but these techniques carry risks from the different shrinkage levels and the higher sintering temperatures needed, which may result in tensile stresses in the outer leading to the possibility of cracking. The present sinter-fusing technique utilizes a temperature just above the WC-Co eutectic and a short isothermal hold compared to that required for a green body.

Referring again to FIG. 5, in step 50, the assembled sintered core and sleeve(s) are joined by fusing the same at a temperature low enough so that minimal grain growth occurs at bonding interface 30. The assembled sintered core and sleeve(s) are placed in a standard sintering furnace and subject to a vacuum or gas atmosphere, without the application of external pressure. For example, the assembled compound roll is brought from room temperature to the fusing temperature of about 1350° C., at about 10° C. per min with about a 15 minute dwell time at the top temperature. This fusing temperature and heat cycle is lower than the original sintering temperatures and heating cycles of the cemented carbide having the lowest melting temperature. For example, of about 1340° C. to about 1360° C. for about 10 to about 30 minutes, and more preferable about 1350° C. for about 15 minutes.

This step takes the already dense and hard pieces of carbide and puts them back into the sintering furnace. But, instead of getting shrinkage and more density, as in the original sintering operation, the core and sleeve(s) remains essentially the same in physical properties.

Figure 6:
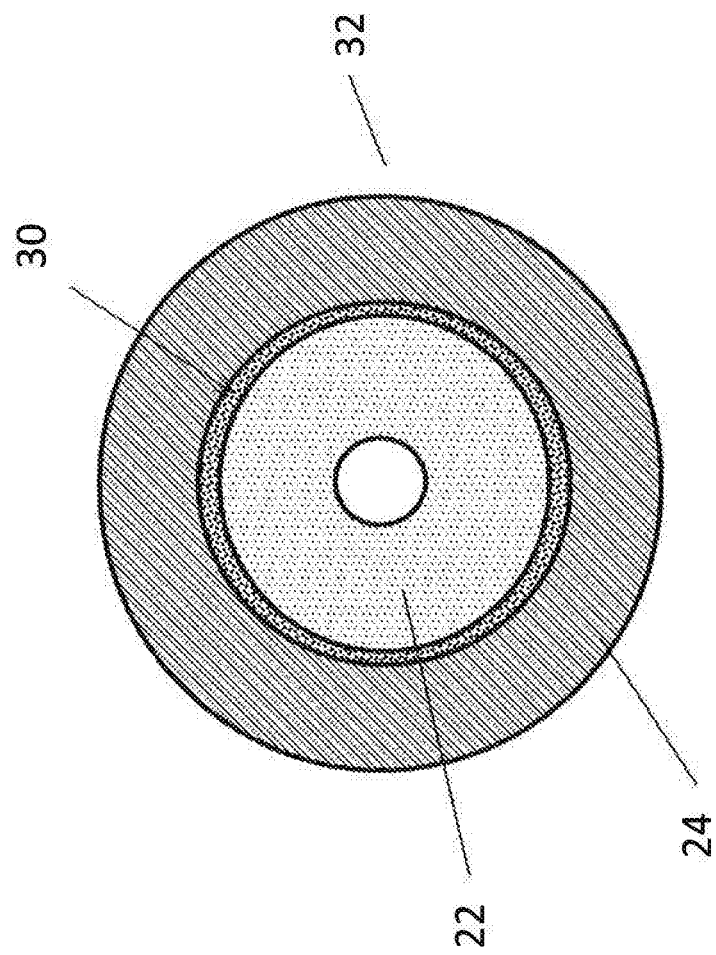
FIG. 6 is a cross-section of the compound roll after joining/fusing.

As shown in FIG. 6, boundary interface 30 is located between the inner core and outer sleeve and occurs at fusion. The parts are fused at a temperature lower than the melting point of cemented carbide having the lowest original sintering temperature of the core and sleeve(s). This lower temperature and shorter time enables the fusing to proceed by short range diffusion of the binder metals across interface 30 and minimal grain growth is induced in the microstructure but a unitary body 32 is formed.

EXAMPLE

The compound roll consisted of an outer sleeve 6% Co binder grade and an inner core of a recycled 30% Ni/Co/Cr binder grade. Both the core and sleeve were pressed on a 50 t manually operated press (Sealey Ltd, Suffolk, UK) using single-ended pressing and sintered at their respective temperatures, 1360° C. for the inner core and 1510° C. for the outer sleeve.

Table 1 shows the dimensions and properties of inner core 22 ("inner") and outer sleeve 24 ("outer") before and after sintering. As can be seen, the weight of the core and sleeve before and after sintering is relatively unchanged. The inner core shrunk slightly and the outer sleeve expanded slightly, but the overall thickness changed by a minimal amount. He increased slightly due to grain coarsening. Accordingly, there is physical contact between the core and sleeve to enable fusing.

TABLE 1

|  | Weight | Thickness (mm) | | Diameter | Hc |
| --- | --- | --- | --- | --- | --- |
|  | (g) | Inner | Outer | (mm) | (kA/m) |
| Before | 106.665 | 7.718 | 7.718 | 36.01 | 4.11 |
| After | 106.675 | 6.551 | 8.052 | 36.58 | 4.35 |

Both the core and sleeve were cut by EDM and initially ground to a locational interference fit according to ISO 286-2:1988 ISO system of limits and fits. The inner core was placed in liquid nitrogen for about 30 s and then pressed into the outer sleeve employing the phenomenon of thermal expansion to make a strong joint, for example, after shrink fitting (shrink fit tolerance+20 µm). The applied tolerance was gradually reduced towards a locational transition fit and the process repeated until the inner core could be positioned within the outer sleeve.

Figure 7A:
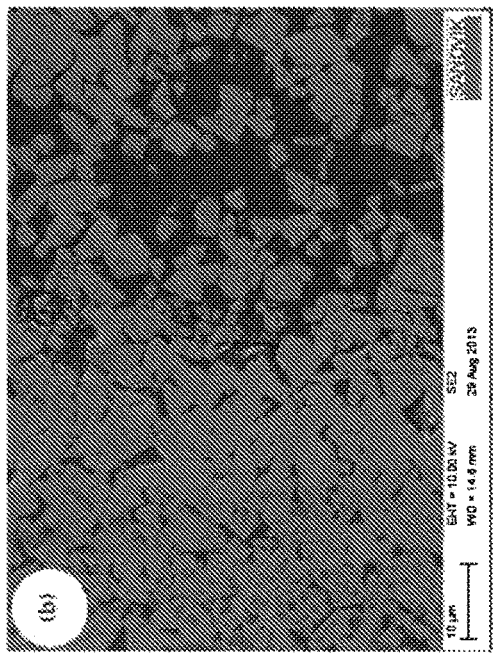
FIGS. 7(a)-7(c) are SEM images of the compound roll according to the present disclosure after assembly and prior to fusing.
Figure 7B:
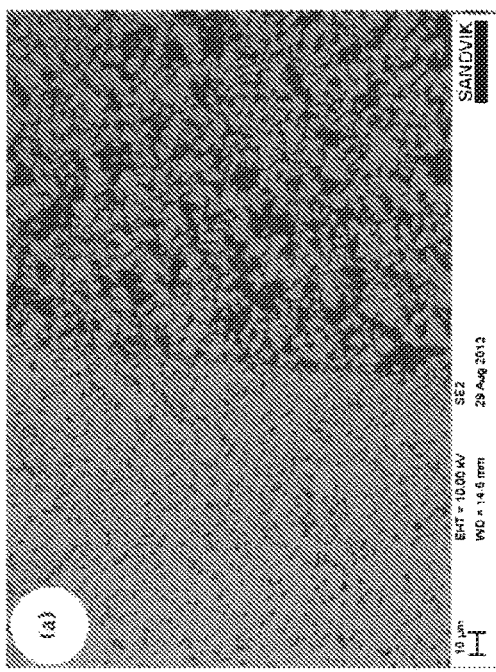
Figure 7C:
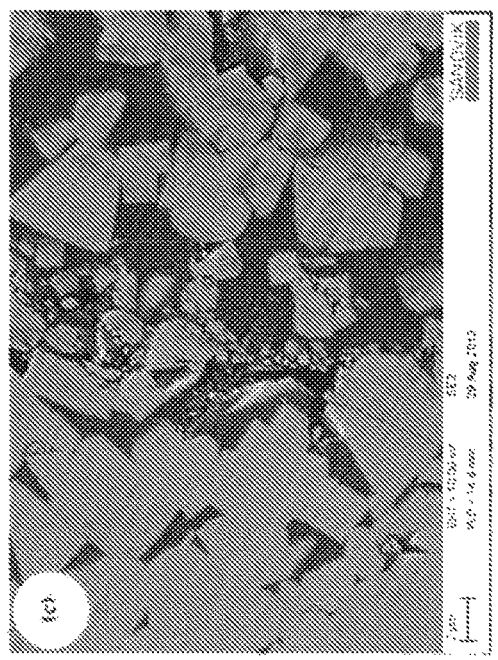

Referring to FIGS. 7(a)-7(c), SEM micrographs show the joint lines 26, 28 between the two members prior to fusing treatment. As can be seen, the core and sleeve are joined together and the same are fused to form a unitary compound roll.

Figures 8A, 8B:
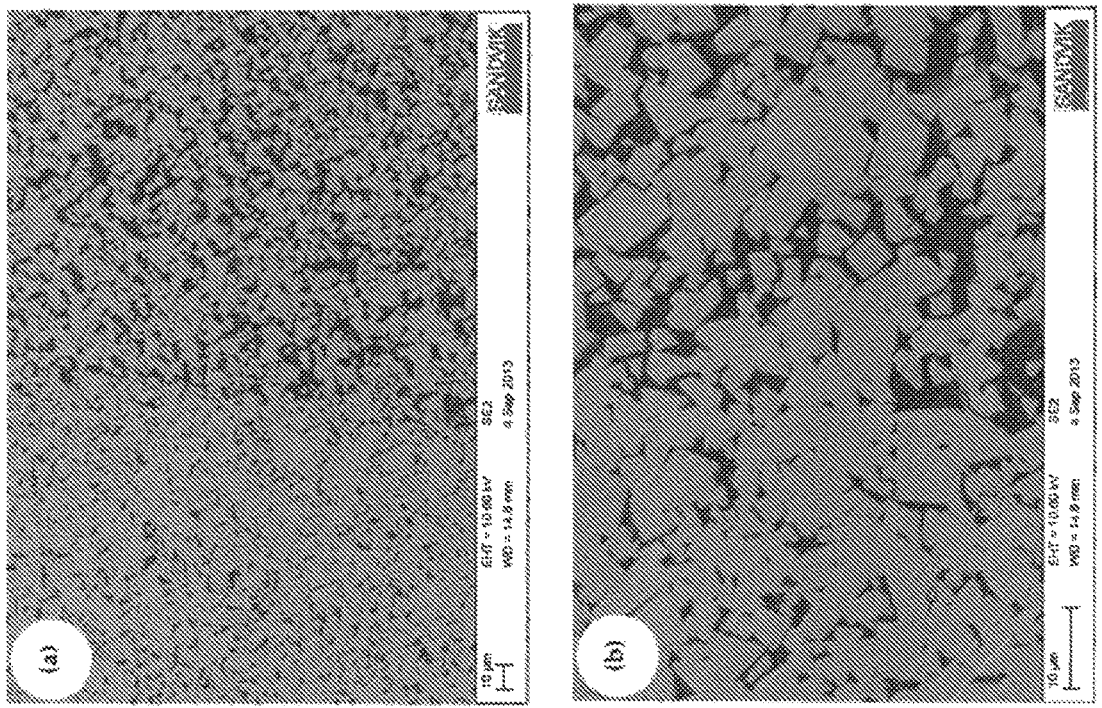
FIGS. 8(a)-8(b) are SEM images of the compound roll according to the present disclosure after fusing.

FIGS. 8(a) and 8(b) are SEM micrographs showing the boundary zone 30 between the core and sleeve after the fusing treatment. As can be seen some grain coarsening has taken place, more so for the inner core material, but not preferentially at the interface of the joining surfaces 26, 28 between the core and outer sleeve.

It should be appreciated that different grade materials can be joined to optimize local properties of the compound roll. Thus, for example, wear resistance, toughness, brazability, friction coefficient and/or cubic boron nitride (cBN) content of a material can be chosen. Moreover, a cobalt or grain-size mismatch can also be chosen to induce binder metal fusing and consequent density changes. This can induce compressive stresses at the surfaces to provide a toughening effect. For example, fatigue resistance could be increased if one or more layers of decreasing Co content/Co mean free path/WC grain size are incorporated.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A compound roll comprising:
   a sintered inner core of a first cemented carbide; and
   at least one sintered outer sleeve of a second cemented carbide disposed around the inner core, the outer sleeve and inner core each having a joining surface, wherein when the inner core and outer sleeve are assembled together each joining surface is brought into contact to form a bonding interface there between,
   wherein when the assembled sintered inner core and the at least one sintered outer sleeve are heated to a predetermined temperature the sintered inner core and the at least one sintered outer sleeve are fused together at the bonding interface to form the compound roll,
   wherein the first and second cemented carbides are made of different cemented carbide,
   wherein the first cemented carbide of the inner core comprises 25 wt % to 100 wt % recycled cemented carbide,
   wherein the second cemented carbide of the at least one outer sleeve consists of virgin cemented carbide, and
   wherein the first cemented carbide of the inner core has a lower density compared to the second cemented carbide of the at least one outer sleeve.

2. The compound roll according to claim 1, wherein the first and second cemented carbide comprises tungsten carbide bonded with a binder.

3. The compound roll according claim 2, wherein the binder content of the first cemented carbide of the one inner core is about 6 wt-% to about 30 wt-%.

4. The compound roll according to claim 1, wherein the sintered inner core and at least one outer sleeve are fused together to form a unitary body, the first and second cemented carbides each have different melting points, and
   wherein the assembled sintered at least one inner core and sintered at least one outer sleeve are heated to a temperature intermediate or lower than the melting point of the lower sintering temperature of the sintered core and sleeve to fuse the same at the bonding interface to form the unitary body.

5. The compound roll according to claim 1, wherein the first cemented carbide has 10% to 15% binder and the second cemented carbide has 6% binder.

6. The compound roll according to claim 1, wherein an average WC grain size in the first and second cemented carbides are the same.

7. The compound roll according to claim 1, wherein an average WC grain size in the first and second cemented carbides is 5.0 µm to 8.0 µm.

8. The compound roll according to claim 1, wherein the second cemented carbide has a radially decreasing Co content.

9. A compound roll of a mill comprising:
   a sintered inner core of a first cemented carbide; and
   a sintered outer sleeve of a second cemented carbide disposed around and fused to the inner core,
   wherein the first cemented carbide is different from the second cemented carbide,
   wherein the sintered inner core and sintered outer sleeve are fused together to form a unitary body, the first and second cemented carbides each having different melting points, and
   wherein the assembled sintered inner core and sintered outer sleeve are heated to a temperature intermediate or lower than the melting point of the lower sintering temperature of the sintered core and sleeve to fuse the same at the bonding interface to form the unitary body, wherein the first cemented carbide of the inner core comprises about 100 wt % recycled cemented carbide, wherein the second cemented carbide of the at least one outer sleeve consists of virgin cemented carbide, and wherein the first cemented carbide of the sintered inner core has a lower density than the second cemented carbide of the sintered outer sleeve.

10. The compound roll according to claim 9, wherein the first cemented carbide has 10% to 15% binder and the second cemented carbide has 6% binder.

11. The compound roll according to claim 9, wherein an average WC grain size in the first and second cemented carbides are the same.

12. The compound roll according to claim 9, wherein an average WC grain size in the first and second cemented carbides is 5.0 μm to 8.0 μm.

13. The compound roll according to claim 9, wherein the second cemented carbide has a radially decreasing Co content.

14. A method of forming a compound roll comprising the steps of:
providing at least one sintered inner core formed of a first cemented carbide;
providing at least one sintered outer sleeve formed of a second cemented carbide;
assembling the at least one sintered inner core and at least one sintered outer sleeve, the at least one sintered outer sleeve and the at least one sintered inner core each having a joining surface, wherein when the at least one sintered inner core and the at least one sintered outer sleeve are assembled each joining surface is brought into contact to form a bonding interface there between; and
heating the assembled at least one sintered inner core and at least one sintered outer sleeve to a predetermined temperature to fuse the assembled at least one sintered inner core and at least one sintered outer sleeve together at the bonding interface to form a compound roll,
wherein the first and second cemented carbides are made of different cemented carbide,
wherein the first cemented carbide of the inner core comprises 25 wt % to 100 wt % recycled cemented carbide, wherein the second cemented carbide of the at least one outer sleeve consists of virgin cemented carbide, and wherein the first cemented carbide of the at least one sintered inner core has a lower density compared to the second cemented carbide of the at least sintered one outer sleeve.

15. The method according to claim 14, wherein each of the first and second cemented carbide comprises tungsten carbide bonded with a binder.

16. The method according to claim 14, wherein the at least one sintered inner core and at least one sintered outer sleeve are fused together to form a unitary body, the first and second cemented carbides each having different melting points, and wherein the assembled at least one sintered inner core and at least one sintered outer sleeve are heated to a temperature intermediate or lower than the melting point of the lower sintering temperature of the at least one sintered inner core and at least one sintered outer sleeve to fuse the same at the bonding interface to form the unitary body.

17. The method according to claim 16, wherein the assembled at least one sintered inner core and at least one sintered outer sleeve are heated to a temperature of about 1340° C. to about 1360° C.

18. The method according to claim 17, wherein the step of fusing further includes subjecting the assembled at least one sintered inner core and at least one sintered outer sleeve to a vacuum or gas atmosphere, without the application of external pressure.

19. The method according to claim 16, wherein the assembled at least one sintered inner core and at least one sintered outer sleeve are heated for a time period of about 10 to about 30 minutes.

20. The method according to claim 14, wherein the assembly step includes shrinking the at least one sintered inner core in liquid nitrogen, and pressing it into the at least one sintered outer sleeve, and wherein thermal expansion between the at least one sintered inner core and the at least one sintered outer sleeve provides a strong joint at the bounding interface.

21. The method according to claim 14, including the step of machining the at least one sintered inner core and the at least one sintered outer sleeve prior to the step of assembling to provide a closer fit there between.

* * * * *